United States Patent [19]
McCollum

[11] 3,890,306
[45] June 17, 1975

[54] NOVEL ACETALS AND METHODS FOR THEIR PREPARATION

[75] Inventor: Anthony W. McCollum, Longview, Tex.

[73] Assignee: Eastman Kodak Company, Rochester, N.Y.

[22] Filed: June 20, 1973

[21] Appl. No.: 372,881

Related U.S. Application Data

[62] Division of Ser. No. 172,324, Aug. 16, 1971.

[52] U.S. Cl...... 260/240 E; 260/88.3 A; 260/340.6; 260/340.9; 260/343.6
[51] Int. Cl............................................. C07d 13/04
[58] Field of Search.......... 260/240 E, 340.9, 347.8, 260/343.6

[56] References Cited
UNITED STATES PATENTS

| | | | |
|---|---|---|---|
| 3,223,713 | 12/1965 | Kesslin et al. | 260/338 |
| 3,558,664 | 1/1971 | Robinson et al. | 260/347.8 |
| 3,564,017 | 2/1971 | Robinson et al. | 260/340.9 |
| 3,671,550 | 6/1972 | Hagemeyer et al. | 260/347.8 |
| 3,787,397 | 1/1974 | McCollum | 260/240 E |

*Primary Examiner*—John D. Randolph
*Attorney, Agent, or Firm*—Cecil D. Quillen, Jr.; Edward R. Weber

[57] ABSTRACT

1,1,4,4-Bis(ethylenedioxy)-3,3-dimethyl-1-butene (referred to as ketene acetal) is prepared by reacting ethylene glycol with tetrahydro-2-isopropyl-6,6-dimethylfuro-(2,3-d)-1,3-dioxol-5-ol in the presence of an acid catalyst at a temperature of from about 110° to 170°C. The water of reaction is preferably removed by the use of a solvent which forms an azeotrope that boils between 110° to 170°C. In an alternative two-step process, tetrahydro-2-isopropyl-6,6-dimethylfuro-(2,3-d)-1,3-dioxol-5-ol is reacted with ethylene glycol in the presence of an acid catalyst at a temperature of from about 60° to 110°C. to form 2-hydroxy-3,3-dimethylsuccinaldehyde bis(ethylenedioxy)acetal (referred to as hydroxy acetal). The 2-hydroxy-3,3-dimethylsuccinaldehyde bis(ethylenedioxy)acetal is then heated to a temperature of from about 110° to 170°C. in the presence of an acid catalyst to give 1,1,4,4-bis(ethylenedioxy)-3,3-dimethyl-1-butene. The water from the two-step process is preferably removed from the reaction as it is formed through the use of an azeotropic solvent. The ketene acetal is useful generally because of its reactive nature and for its ability to form oxetane polymers and polyesters. The hydroxy acetal is useful as a gel hardener, as a cross-linking agent for use with cellulose derivatives and polyols, and as a chemical intermediate.

18 Claims, No Drawings

NOVEL ACETALS AND METHODS FOR THEIR PREPARATION

This is a division of application Ser. No. 172,324, filed Aug. 16, 1971.

This invention relates to a novel compound of the ketene acetal class and to a method for its preparation. More particularly, the invention is concerned with the novel compound 1,1,4,4-bis(ethylenedioxy)-3,3-dimethyl-1-butene, and the novel compound 2-hydroxy-3,3-dimethylsuccinaldehyde bis(ethylenedioxy)acetal which is produced as an intermediate chemical in an alternate two-stage process for producing the aforementioned ketene acetal.

For purposes of clarity, in the remainder of this specification the starting material tetrahydro-2-isopropyl-6,6-dimethylfuro-(2,3d)-1,3-dioxol-5-ol will be referred to as the "bicyclic acetal." This material and a method for its manufacture are disclosed in U.S. Pat. No. 3,564,017. The product 1,1,4,4-bis(ethylenedioxy)-3,3-dimethyl-1-butene will be referred to as "ketene acetal" and the alternate intermediate product 2-hydroxy-3,3-dimethylsuccinaldehyde bis(ethylenedioxy)acetal will be referred to as "hydroxy acetal."

The novel ketene acetal of the invention has the formula

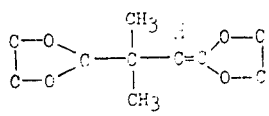

and is useful because of its reactive nature and its ability to be polymerized to form oxetane polymers and polyesters through the ketene acetal functionality. Utility of ketene acetals in general has been demonstrated by McElvain & Curry *J. Am. Chem. Soc.*, 70, 3781 (1948) and Mukaiyana *J. Org. Chem.*, 27, 3339 (1962). The novel hydroxy acetal is valuable not only for its ability to be further dehydrated to form the novel ketene acetal, but also as a gel hardener, as a cross-linking agent for use with cellulose derivatives and with polyols such as a polyvinyl alcohol and as a chemical intermediate.

It was quite unexpected that the feed bicyclic acetal could be reacted with a diol to form either the ketene acetal or the hydroxy acetal with a high degree of specificity. The feed bicyclic acetal contains internal hemiacetal as well as acetal functionality and its cyclic structure is very stable under most conditions. When the bicyclic acetal is treated at atmospheric pressure with an acid catalyst, in refluxing benzene as a solvent and water is azeotroped, the resultant ether dimer

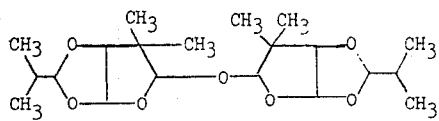

is obtained. This serves to demonstrate the high degree of stability of the bicyclic structure. In addition, one skilled in the art would have predicted a number of other possible products from the reaction of ethylene glycol with the bicyclic acetal. For example, two possible compounds from the acid catalyzed reaction of the bicyclic acetal and ethylene glycol are 3,3-dimethyl-2,2,4,4-bis(ethylenedioxy)butanol

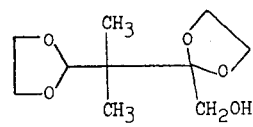

and 2-hydroxy-3-(1,1-dimethyl-2,2-ethylenedioxyethyl)-1,4-dioxane.

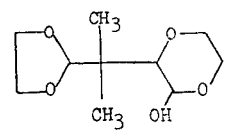

When an acrolein dimer, also a potential α-hydroxydialdehyde, is reacted with ethylene glycol under similar acidic conditions, an approximately equal mixture of three products along with large amounts of polymeric residue is produced. Likewise, various rearrangements of the feed bicyclic acetal could be expected. An example of this is the Lobry-deBruyn rearrangement wherein an α-hydroxyaldehyde is rearranged to an α-hydroxy ketone. In fact, it has been found that when the bicyclic acetal is heated to about 80°–150°C. with a catalytic amount (0.5–5.0% by wt.) of sodium acetate, 2,2-dimethyl-3-oxy-4-hydroxy butyraluehyde is formed. This compound is isolated in its cyclic hemiacetal form

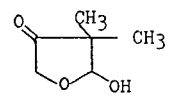

by distilling it from the reaction mixture at a temperature of about 60°–100°C. and a pressure of from about 0.5 to 30 mm.

It is therefore quite surprising that the bicyclic acetal will react with a diol under the relatively mild conditions of the invention to give high yields of the ketene acetal or in the alternative the hydroxy acetal. In carrying out the reaction of the invention, the bicyclic acetal is reacted with three equivalents of a diol and an acid catalyst such as p-toluenesulfonic, hydrochloric or sulfuric acid. Suitable diols include any diol wherein the hydroxy group is in the 1,2- or 1,3-position. Typically, diols such as 1,2-propanediol, neopentyl glycol, 2,2,4-trimethylpentanediol-1,3 and ethylene glycol may be used. Any of several known methods such as direct distillation, inclusion of a dehydrating agent or physical removal by molecular sieves may be used for removing the water. A preferred method is the use of a solvent which will form an azeotrope having a suitable boiling point with the liberated water. This method offers the dual advantage of removing the water and simultaneously controlling the reaction temperature. Suitable solvents may be grouped by their boiling point with those having a boiling point of from 110°–170°C., of which xylene butyl chloroacetate, butyl acetate and isobutylbutyrate are examples, being used in the one-step process for forming the ketene acetal, and those solvents having a boiling point of between 60°–110°C., such as benzene, dichloroethane, dioxane and 1,2- diethoxyethane being utilized in the initial step of the two-step procedure wherein the hydroxy acetal is formed as an intermediate. In the two-step process, the hydroxy acetal is subsequently reacted in the presence of a solvent of the higher boiling group (110°–170°C.) to form the ketene acetal. Obviously, if the hydroxy acetal itself is desired, the second step is unnecessary. The relationship of the one- and two-step process can be better understood by the following multiple equations wherein the route marked A characterizes the one-step process, the route marked B characterizes the first step of the two-step process and the route marked C characterizes the second step of the two-step process.

lution and 200 ml. of water. The solvent is removed at 200 mm. with a maximum pot temperature of 60°C. The resultant 205 grams (94 percent) of oil is found to be of high purity by gas phase chromatographic analysis and exhibits the following spectra: $\lambda_{max}^{film}$ 3520, 2920, 1450 and 1060 cm$^{-1}$; nuclear magnetic resonance (CDCl)$_3$ $\tau$9.12(s), 9.05(s), 7.12(s), 6.47(t), 6.18(m), 5.20(s) and 5.08(d); percent hydroxyl, theoretical 7.8 percent, actual 6.0 percent.

EXAMPLES 2–5

Examples 2–5 show that other acidifying agents as well as other glycols can be used in the reaction. The

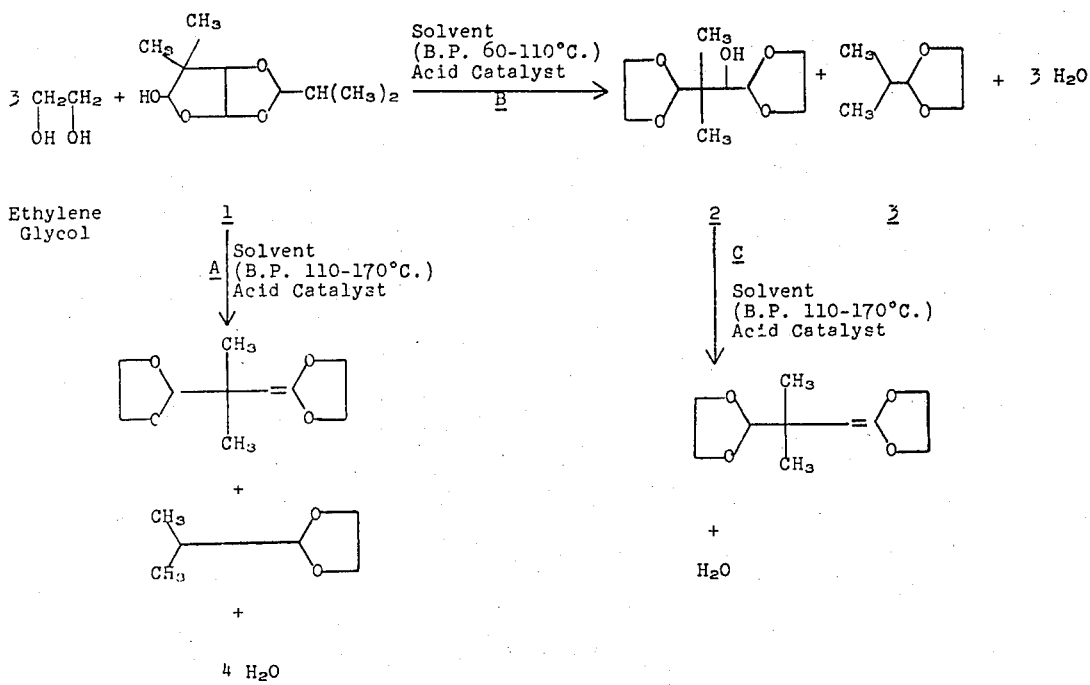

Catalyst concentration is not critical and may range from 0.001 to 2 mole percent based upon the moles of starting material. A preferred concentration is 0.01%.

This invention is further illustrated by the following examples which are set forth for purposes of illustration only and should not be construed as limiting the invention in any manner.

EXAMPLE 1

The purpose of this example is to describe the method of choice for the preparation of 2-hydroxy-3,3-dimethylsuccinaldehyde 1,1,4,4-bis(ethylenedioxy)acetal 2-Hydroxy-3,3-dimethylsuccinaldehyde
1,1,4,4-bis(ethylenedioxy)acetal In a 2-liter flask equipped with a Dean-Stark trap and condenser is placed 202 grams (1 mole) of the bicyclic acetal, 184 grams (3 moles) of ethylene glycol, 500 ml. of benzene, and 0.2 gram of p-toluenesulfonic acid. The contents are vigorously stirred under a nitrogen atmosphere and refluxed for 15 hours. The total water removed is 3.2 moles. The solution is cooled to room temperature, treated with 0.2 gram of pyridine, and washed with 100 ml. of 1 percent sodium hydroxide soreaction solvents (B.P. range 60°–110°C.) of Examples 2–5 produce the hydroxy acetal. The procedure of Example 1 is followed except that the solvents, acidifying agents and glycols listed are used.

| Example | Solvent | Acidifying Agent | Glycol | % Yield |
|---|---|---|---|---|
| 2 | Benzene | p-Toluene-sulfonic | Neopentyl glycol | 80 |
| 3 | Benzene | Hydrochloric | Neopentyl glycol | 75 |
| 4 | Dioxane | Sulfuric | 1,3-Propylene glycol | 66 |
| 5 | 1,2-Dichloro-ethane | p-Toluene-sulfonic | Neopentyl glycol | 82 |

EXAMPLE 6

Example 6 shows a preferred method for the preparation of 1,1,4,4-bis(ethylenedioxy)-3,3-dimethyl-1-butene and shows that the bicyclic acetal can be converted in one step to the ketene acetal.

1,1,4,4-bis(ethylenedioxy)-3,3-dimethoyl-1-butene

In a 500 ml., round-bottom flask is placed 67.4 grams (0.33 mole) of the bicyclic acetal, 68 grams (1.1 mole) of ethylene glycol, 200 ml. of xylene, and 0.29 ml. of p-toluenesulfonic acid. A Dean-Stark trap and condenser is attached, and reflux is continued for 4 hours. The total water collected is 24 ml. (1.33 moles). The solution is treated with 1 gram of sodium acetate, placed under a 10-plate Oldershaw column and distilled. A colorless liquid, 40.0 grams (60%) with boiling point 105°C./2 mm. is realized; $\lambda_{max}^{film}$ 3080, 2910, 1685(s), 1480, 1270, and 110 cm$^{-1}$; nuclear magnetic resonance (CDCl$_3$), 4.18(s), 5.26(s), 6.12(s), 6.25(s), and 9.01(s); mass spectrometer, m/e(P) 200.

EXAMPLES 7–9

Examples 7–9 show that other acidifying agents, glycols and solvents with B.P. range 110°–170°C. allow the synthesis of the ketene acetal in one step. The procedure of Example 6 is followed except that the solvents, acidifying agents and glycols listed are used.

| Ex. | Solvent | Acidifying Agent | Glycol | % Yield |
|---|---|---|---|---|
| 7 | Xylene | Hydrochloric | Neopentyl glycol | 62 |
| 8 | Isobutyl-butyrate | p-Toluene-sulfonic | Ethylene glycol | 43 |
| 9 | Xylene | p-Toluene-sulfonic | 2,2,4-Tri-methylpentane-1,3-diol | 21 |

EXAMPLE 10

Example 10 shows that in addition to the direct synthesis of the ketene acetal, the hydroxy acetal can be subsequently converted to the ketene acetal.

1,1,4,4-bis(ethylenedioxy)-3,3-dimethyl-1-butene

In a 500 ml. flask is placed 19 grams (0.087 mole) of 2-hydroxy-3,3-dimethylsuccinaldehyde 1,1,4,4-bis(ethylenedioxy)acetal, 150 ml. of xylene, and 0.12 gram of p-toluenesulfonic acid. A Dean-Stark trap and condenser is attached, reflux is continued for 3 hours during which 0.08 mole of water is collected. Work-up is identical to Example 2 and distillation yields 14 grams of the ketene acetal.

Although the invention has been described in detail with particular reference to certain preferred embodiments thereof, it will be understood that variations and modifications can be effected within the spirit and scope of the invention.

I claim:

1. The compound 1,1,4,4-bis(ethylenedioxy)-3,3-dimethyl-1-butene.

2. The compound 2-hydroxy-3,3-dimethylsuccinaldehyde bis(ethylenedioxy)acetal.

3. A process for preparing 2-hydroxy-3,3-dimethylsuccinaldehyde bis(ethylenedioxy)acetal which comprises contacting tetrahydro-2-isopropyl-6,6-dimethylfuro-(2,3-d)-1,3-dioxol-5-ol with at least three equivalents of a diol wherein the hydroxy groups are in the 1,2- or 1,3-position, at a temperature greater than about 60°C. and less than about 110°C., in the presence of an acid catalyst selected from the group consisting of p-toluenesulfonic, hydrochloric and sulfuric acid and continuously removing the water liberated during the reaction.

4. The process of claim 3 wherein the reaction is conducted in an inert organic solvent having a boiling point greater than about 60°C. and less than about 110°C.

5. The process of claim 3 wherein the diol is selected from the group consisting of ethylene glycol, 1,2-propanediol, neopentyl glycol and 2,2,4-trimethylpentanediol-1,3.

6. The process of claim 3 wherein the catalyst concentration is from about 0.001 to about 2.0 mole percent based on the moles of starting material.

7. The process of claim 3 wherein the catalyst concentration is about 0.01 mole percent based on the moles of starting material.

8. The process of claim 3 wherein the catalyst is p-toluenesulfonic acid.

9. The process according to claim 3 wherein the glycol is ethylene glycol.

10. The process according to claim 4 wherein the inert organic solvent is selected from a group consisting of dichloroethane, dioxane, 1,2-diethoxyethane and benzene.

11. The process according to claim 4 wherein the inert organic solvent is benzene.

12. A process for preparing 1,1,4,4-bis(ethylenedioxy)-3,3-dimethyl-1-butene which comprises heating 2-hydroxy-3,3-dimethylsuccinaldehyde bis(ethylenedioxy)acetal to a temperature greater than about 110°C. and less than about 170°C. in the presence of an acid catalyst selected from the group consisting of p-toluenesulfonic, hydrochloric and sulfuric acid and continuously removing the water liberated during the reaction.

13. The process of claim 12 wherein the reaction is conducted in an inert solvent having a boiling point greater than about 110°C. and less than about 170°C.

14. The process of claim 12 wherein the catalyst concentration is from about 0.001 to about 2.0 mole percent based on the moles of starting material.

15. The process of claim 12 wherein the catalyst concentration is about 0.01 mole percent basead on the moles of starting material.

16. The process of claim 12 wherein the catalyst is p-toluenesulfonic acid.

17. The process of claim 13 wherein the inert organic solvent is selected from the group consisting of xylene, butyl chloroacetate, butyl acetate and isobutylbutyrate.

18. The process of claim 13 wherein the inert organic solvent is xylene.

* * * * *